United States Patent

Rochester

[11] Patent Number: 5,410,396
[45] Date of Patent: Apr. 25, 1995

[54] AUTOMATED TEST STATION FOR PERFORMING A VARIETY OF TESTS ON OPTICAL FIBER UNDER TENSION

[75] Inventor: James R. Rochester, Tucson, Ariz.

[73] Assignee: Hughes Aircraft Company, Los Angeles, Calif.

[21] Appl. No.: 3,062

[22] Filed: Jan. 11, 1993

[51] Int. Cl.6 ............................................. G01N 21/89
[52] U.S. Cl. ..................... 356/73.1; 356/429
[58] Field of Search ................. 356/73.1, 429, 430, 356/389

[56] References Cited

U.S. PATENT DOCUMENTS

| | | | |
|---|---|---|---|
| 3,599,223 | 8/1971 | Bridenbaugh et al. | 356/430 X |
| 4,924,087 | 5/1990 | Bailey et al. | 356/73.1 |
| 4,997,276 | 3/1991 | Rochester | 356/73.1 |
| 5,263,112 | 11/1993 | Holt | 356/73.1 X |

FOREIGN PATENT DOCUMENTS

| | | | |
|---|---|---|---|
| 58-28639 | 2/1983 | Japan | 356/73.1 |
| 60-179625 | 9/1985 | Japan | 356/73.1 |

Primary Examiner—Vincent P. McGraw
Attorney, Agent, or Firm—Randall M. Heald; Charles D. Brown; Wanda K. Denson-Low

[57] ABSTRACT

An optical fiber evaluation test station (20) includes optical fiber supply (26), translation, and rewinding mechanisms (52), and at least one module performing a test of optical fiber quality through which the optical fiber (22) continuously passes. The test station (20) includes a supply section wherein the optical fiber (22) is paid out from a supply spool (24) and cleaned by a cleaning and static discharging unit (30). There is a high tension test section wherein tests such as a buffer cure test (46) and a bend proof test (48) are performed. In a low tension test section, tests such as an optical fiber diameter test (58), a buffer flaw test (60), and a visual observation test (64) are performed. Tension-isolating capstans (40, 44) separate the various sections, optical fiber guides (62) direct the optical fiber (22) and stabilize its movement, and spring-mounted dancers (36, 42) measure the tension in the optical fiber (22) in the tension-isolated sections.

13 Claims, 8 Drawing Sheets

AUTOMATED TEST STATION FOR PERFORMING A VARIETY OF TESTS ON OPTICAL FIBER UNDER TENSION

This invention relates to optical fibers, and, more particularly, an apparatus for continuously testing a length of optical fiber for a variety of types of defects.

Glass fibers for optical information transmission are strands of glass fiber processed so that light transmitted through the fiber is subject to total internal reflection. A large fraction of the incident intensity of light directed into the glass fiber is received at the other end of the fiber, even though the glass fiber may be hundreds or thousands of meters long. Optical-quality glass fibers have shown great promise in communications applications, because a high density of information may be carried along the glass fiber and because the quality of the signal is less subject to external interferences of various types than are electrical signals carried on metallic wires. Moreover, the glass fibers are light in weight and made from a plentiful substance, silicon dioxide.

The glass fibers are fabricated by preparing a preform of glasses of two different optical indices of refraction, one inside the other, and processing the preform to a fiber. The optical glass fiber is coated with a polymer layer termed a buffer to protect the glass from scratching or other damage, and the resulting coated glass fiber is generally termed an "optical fiber" in the art. As an example of the dimensions, in a typical configuration the diameter of the glass fiber is about 125 micrometers, and the diameter of the glass fiber plus the polymer buffer (the optical fiber) is about 250 micrometers (approximately 0.010 inches).

The glass fiber exhibits excellent light and information transmission over lengths of thousands of meters, if it has a high degree of perfection. Unfortunately, even one imperfection of sufficient size in the glass fiber in that length may be sufficient to render the optical fiber useless for transmitting light and in formation over great distances. The optical fibers are strong in tension, but bending the optical fibers over a small radius can cause them to break. The breaking strength exhibited by the optical fibers in bending is related to their perfection at the point where the bending stress is applied. A single strength-reducing imperfection of sufficient size can cause the optical fiber to break at a prematurely low stress at some point along its length, interrupting its light transmission.

Thus, it is important to ensure that an optical fiber have absolutely no imperfections that will render it inoperable during service, before the optical fiber is placed into service. The optical fiber may be tested prior to entering service by either sampling or full-length testing. In sampling, a position along the length of the optical fiber is selected randomly and evaluated. This approach is unacceptable for fibers to be used in critical applications where even one failure is fatal to the application, because the absence of an imperfection at one location does not establish the absence of an imperfection at another location. Thus, one location might be unflawed, while a damaging flaw might be present one centimeter away and remain undetected.

Full-length testing of an optical fiber can be readily accomplished for some properties. For example, the ability of an entire length of optical fiber to transmit a light signal, when no stress or bending is applied to the optical fiber, can be established by introducing a light signal at one end and receiving it at the other. If the attenuation is below some preselected standard, the optical fiber is accepted.

On the other hand, other properties cannot be so readily evaluated along the entire length of the optical fiber. For example, for some optical fiber applications, such as unwinding from a canister, the optical fiber is bent to a small radius at the "peel point" where it leaves the bobbin upon which it is wound. Bending an optical fiber to a small radius can increase the attenuation of a transmitted light beam significantly. This attenuation also depends upon the presence of imperfections at the point of bending. In order to test for the presence of imperfections which would adversely influence the light transmission as each point along the optical fiber is peeled from the bobbin, a bend of comparable radius must be propagated along the entire length of the optical fiber, while simultaneously conducting an end-to-end light transmission test as described previously.

The test of light transmission during peeling is only one example of the several types of tests that should be performed over the entire length of those optical fibers that are to be used in critical applications. Other exemplary types of tests that can be performed along the entire length of the optical fiber include diameter measurement, evaluation of cure state of the buffer layer, and bend proof stress testing. Individual procedures and apparatus have been developed for many of these tests.

When multiple tests are to be performed on a length of optical fiber, the economics of testing become an important consideration. In one example, if a 10 kilometer length of optical fiber is passed through a test module, which performs one of the indicated types of tests at a rate of 1 meter per second, about 2¾ hours is required to test the entire length of the optical fiber. If four separate tests are to be performed, over 11 hours of testing-machine and operator time is required for each 10 kilometer length, plus set-up time and the time required to evaluate any imperfections that are detected. The testing itself may introduce potential problems, such as dirt contacted to the surface of the optical fiber. If hundreds of the 10 kilometer lengths must be tested, the cost of testing may be prohibitively high.

One possible approach to reducing the testing cost is to combine two or more individual tests into a single testing machine, so that more than one test is performed on the optical fiber as it is unwound once, passed through the various testing modules, and rewound onto another spool. Unfortunately, various of the tests require different test conditions such as different tensions to be applied to the optical fiber during the testing. Moreover, data collection and evaluation become increasing complex as more tests are grouped together, and as the speed of movement of the optical fiber through the test modules is increased.

There has been demonstrated no satisfactory testing machine for performing full-length optical fiber testing at high testing rates and with multiple tests. Any such machine should be sufficiently flexible that it can be adapted for a variety of different types of testing requirements. There is a need for such a machine as the use of optical fibers increases in a wide variety of applications. The present invention fulfills this need, and further provides related advantages.

SUMMARY OF THE INVENTION

The present invention is embodied in an optical fiber test station that permits a variety of different tests to be selected and performed on an optical fiber that is transported at speeds in the 1–10 meter per second range, and potentially even higher. The apparatus is highly versatile, and permits a variety of tests to be performed at both high and low applied tensions. The test station accepts optical fiber that has not been optimally wound onto spools, performs the selected tests, records and analyzes imperfections identified in the tests, and winds the optical fiber into a selected arrangement on a receiver spool with the proper tension and winding pattern for subsequent operations. The testing operation is fully automated, except for loading the supply spool of optical fiber.

In accordance with the invention, an optical fiber test station comprises a supply section having means for supplying a continuous length of optical fiber through a fixed point. There is a high tension test section through which the optical fiber passes after leaving the supply section, including means for increasing the tension in the optical fiber to a preselected higher tension than found in the supply section. At least one test of optical fiber quality is performed on the optical fiber as it continuously moves through the high tension test section. The test station further includes a low tension test section through which the optical fiber passes after leaving the high tension test section, including means for reducing the tension in the optical fiber to a preselected lower tension than found in the high tension test section. At least one test of optical fiber quality is performed on the optical fiber as it continuously moves through the low tension test section, and means for winding the optical fiber onto a receiver spool.

Optical fiber is typically supplied on spools which have been wound in an irregular, side-to-side layered pattern. The preferred form of the test station includes a supply mechanism that unwinds the optical fiber from the supply spool through a fixed point in space, so that it can be properly processed. The optical fiber is cleaned and statically discharged, and its tension level measured.

The optical fiber is then passed through a first tension-isolating mechanism, preferably a tension-isolating capstan, that permits the applied tension in the optical fiber on one side of the capstan to be greater than that on the other. In the preferred form, the optical fiber in the supply section is under a generally low, but not fully controllable tension, because there may be irregularities in the winding of the supply spool that would cause the optical fiber to break if a high tension were applied. Some tests require a high applied tension, and the first tension-isolating capstan defines one end of a section of high applied tension. Tests that are typically performed in the high tension test section include the preferred forms of a buffer layer cure test and a bending proof stress and bending loss test.

A second tension-isolating mechanism defines the end of the high tension test section and the beginning of a low tension test section. At the end of the low tension test section, the optical fiber is wound under the controlled tension of this section onto a receiver spool in a pattern that is selected as suitable for the next processing operation. The high tension required for some of the tests of the prior section is not suitable for winding of the optical fiber onto the receiver spool, and the winding of a canister under too high a tension can itself lead to certain types of defects. The second tension-isolating mechanism is therefore necessary for the successful operation of the test station. While the optical fiber passes through the low tension test section, tests that are typically performed include preferred forms of a precise fiber diameter measurement and a laser light-scattering flaw detection test.

The test station is controlled by a computer, and includes an analysis computer that receives input signals in the form of data or flags that warn of an out-of-limits condition, and also a positional indication that measures the distance of the location under test along the length of the optical fiber. Distance is preferably measured using a rotational encoder on one of the elements that rotates as the optical fiber passes over it, such as the first tension-isolating capstan. When an unacceptable imperfection or an out-of-limits condition is detected, the translation of the optical fiber is stopped and the optical fiber backed up so that the region suspected of having a problem is in the field of view of a videocamera that, operating through a magnifying lens, views and records the nature of the problem for immediate or later review. Thus, the nature of the imperfection or out-of-limits condition, together with its position along the length of the optical fiber, is recorded as data for repair or analysis.

The approach of the invention provides an important advance in the art of optical fiber testing. A number of tests can be performed on a length of optical fiber as it passes through the apparatus, requiring only a single unwinding and subsequent rewinding. Other features and advantages of the invention will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENT

Figure 1:
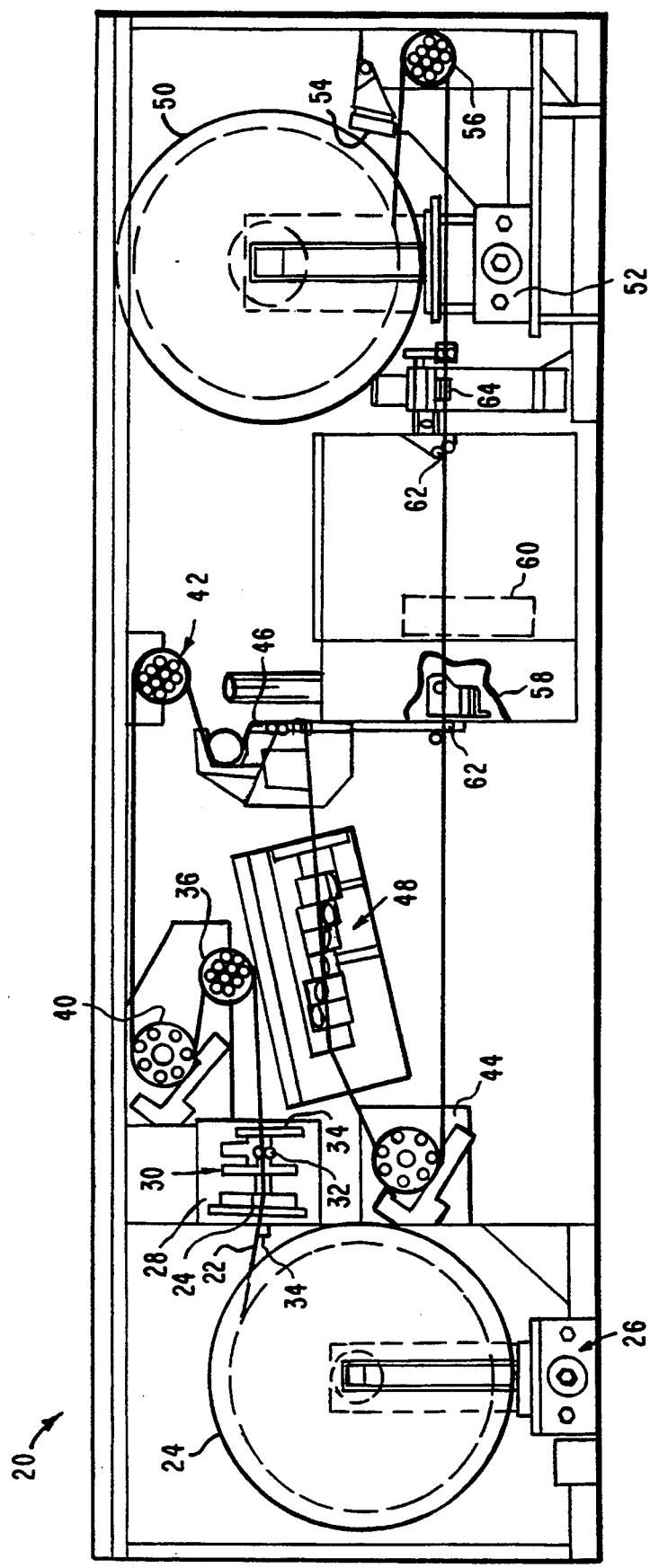
FIG. 1 is an elevational view of an optical fiber test station.
Figure 2:
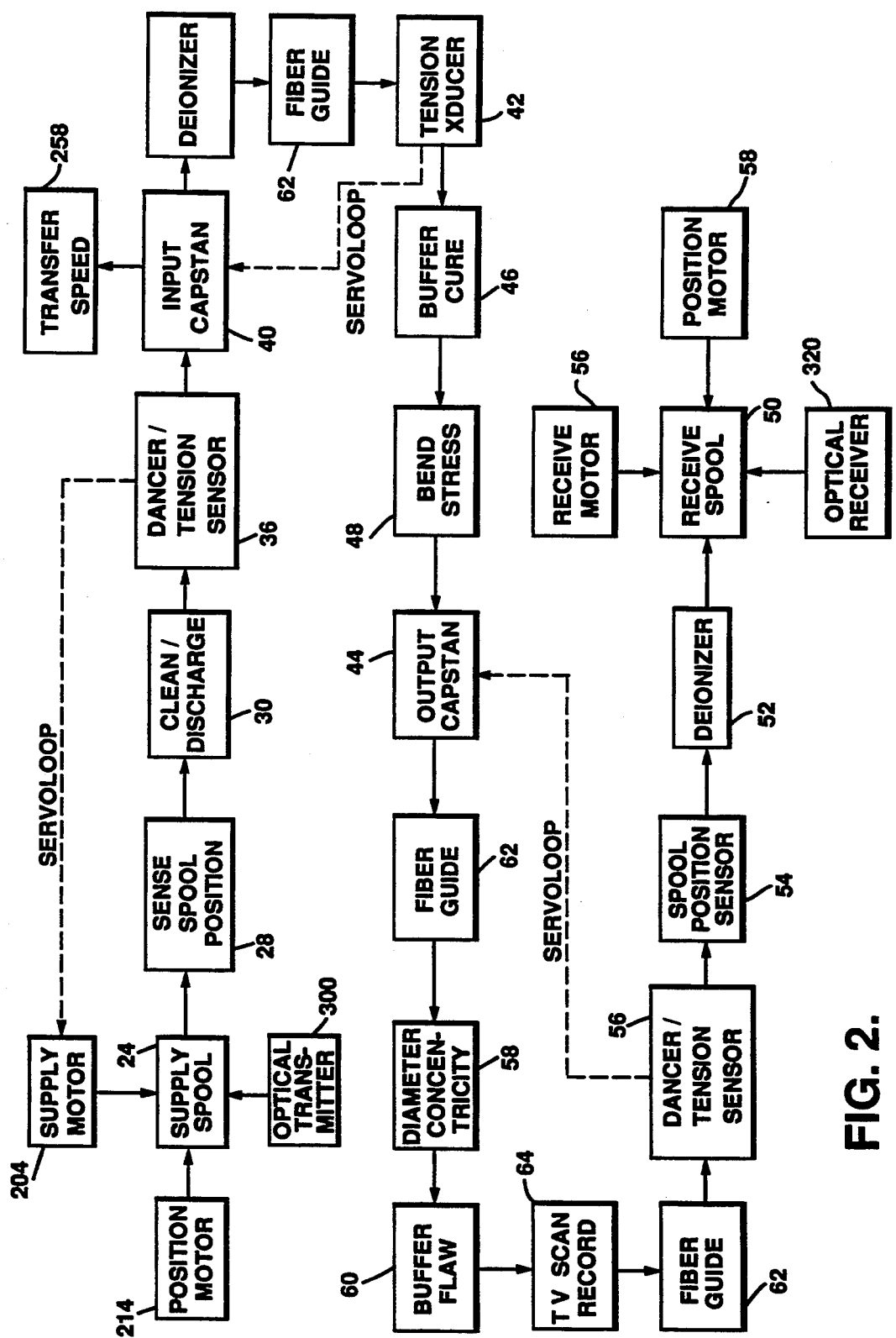
FIG. 2 is a flow diagram for the operation of the test station of FIG. 1.

An optical fiber test station 20 is illustrated in FIG. 1, and a block diagram of the movement of an optical fiber through the test station is depicted in FIG. 2.

Figure 3:
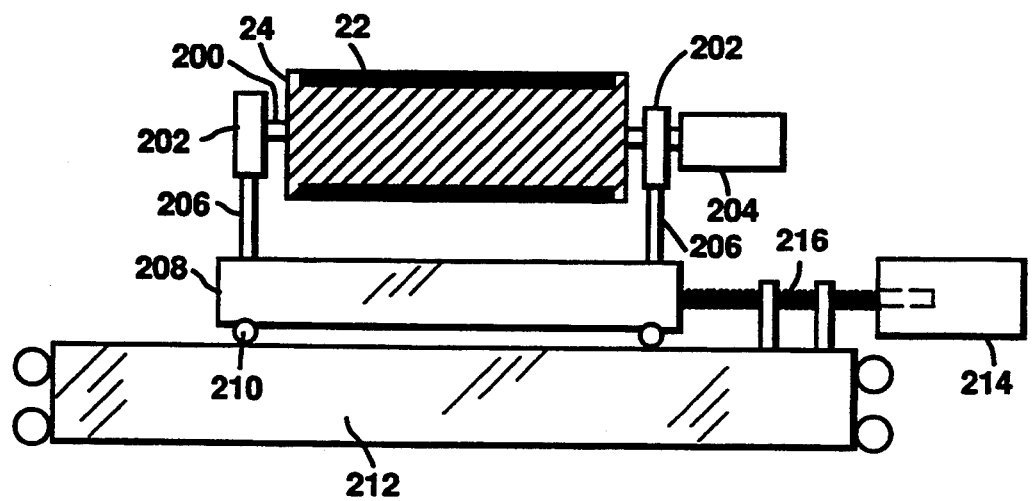
FIG. 3 is an elevational view of a supply drive and supply spool.

A length of optical fiber 22 is provided on a supply spool 24. The optical fiber 22 is provided from the manufacturer or from prior testing wound on the spool 24 in a pattern that cannot be known or predicted prior to unwinding. The supply spool 24 is mounted on a supply drive 26 of the test station 20, which is depicted in greater detail in the plan view of FIG. 3.

Figure 9:
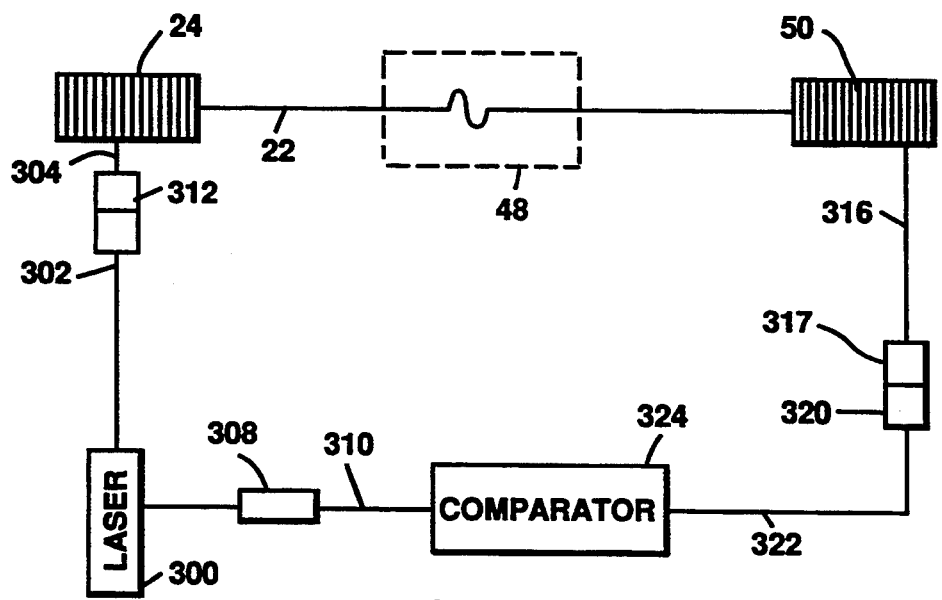
FIG. 9 is a schematic diagram of a full-length optical transmission test device.

Referring to FIG. 9, the supply spool 24 is supported on an axle 200, which in turn is supported on bearings 202. An electric supply motor 204 controllably turns the axle 200 and the supply spool 24 to cause the optical fiber 22 to be unwound from, or wound onto, the spool 24. The supply spool 24, bearings 202, and motor 204 are mounted by struts 206 to a movable table 208. The movable table 208 is supported on linear bearings 210 that ride along a track 212. A positioning motor 214 drives the movable table 208 back and forth along the track 212 by means of a worm gear 216 or any other suitable drive mechanism. The positioning motor 214 therefore permits the point at which the optical fiber is unwound or paid out from the supply spool 24 to be maintained at a constant location in space by moving the supply spool 24 back and forth in a direction parallel to its cylindrical axis. The constant positioning of the supply point permits the maintaining of proper alignment of the optical fiber with the mechanism of the test station 20, without regard to, or prior knowledge of, the winding pattern of the optical fiber 22 onto the supply spool 24.

Figure 4:
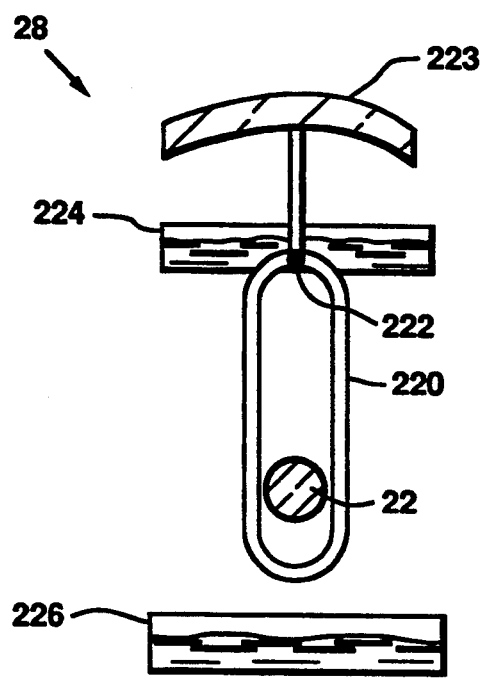
FIG. 4 is an elevational view of a spool position sensor.

A spool positioning sensor 28 is mounted in the test station 20 to define the unwinding point at which optical fiber 22 is unwound from the supply spool 24. The spool position sensor 28 is illustrated in more detail in FIG. 4, in a view with the optical fiber 22 extending out of the plane of the figure. A wire loop 220 with the optical fiber 22 passing therethrough is supported from a pivot point 222. An optical sensor 229 measures the rotation of the loop 220 about the pivot point 222. As long as the optical fiber 22 does not touch the loop 220, the loop 220 remains stationary. If the optical fiber 22 moves to the left (as a result of the winding pattern on the supply spool 24) so that it touches the left hand side of the loop 220, the loop 220 pivots clockwise in the view of FIG. 4, causing the loop 220 to rotate about the pivot 222 and moving the measuring head so that the rotation may be measured. If the optical fiber 22 moves to the right, an opposite indication is made.

The movement of the sensor 28 is fed back to the positioning motor 214, to cause the table 212 and thence the position of the supply spool 24 to move from side to side. The direction of movement is always to reduce the rotational deflection of the loop 220, to bring the loop 220 back to the vertical position with the optical fiber 22 centered in the loop 220. The result is that the optical fiber 22 is always paid out from the supply spool 24 through a fixed point in space, the zero-deflection point of the loop 220, regardless of how the optical fiber might be wound upon the supply spool 24. This positioning is necessary to feed the optical fiber smoothly into the remainder of the test station 20.

At about the same point along its path as the spool position sensor 28, the optical fiber 22 is treated by a cleaning/static discharging unit 30. The unit 30 removes dirt and organic material from the surface of the optical fiber 22 by applying a solvent and then wiping away the solvent with counter-rotating pads 32 made of soft synthetic sponge. The solvent, such as trichloroethane, is applied by the wire loop 220 of FIG. 4. The solvent is contained in a solvent supply basin 224 having a open face immediately adjacent to the loop 220 but out of the plane of the loop. A small amount of solvent feeds down the wires of the loop 220 by capillary action, and contacts the optical fiber 22. A sufficient amount of the solvent is transferred to the optical fiber 22 to mobilize dirt and organic material that might be on the surface of the optical fiber 22. Any excess solvent is caught in a catch basin 226. The mobilized dirt and organic material are then wiped away by the counter-rotating pads 32. The pads 32 are each mounted on an axle that rotates about its axis, and also slowly moves back and forth parallel to the axle so that dirt and organic matter transferred to the pads are not transferred back to the optical fiber at another point. A second set of pads, not visible in the figure, is located along the fiber path behind the first set of pads 32, assuring optical fiber cleanliness and removal of residual solvent remaining on the optical fiber.

The cleaning/static discharging unit 30 also includes at least one, and preferably two, static discharging heads 34 closely adjacent to the path of the optical fiber 22. The optical fiber 22 may accumulate stationary electrical charges on its surface while on the supply spool 24 or while being removed from it, and these charges are removed prior to the commencement of further testing. The static discharging heads 34 create a high voltage to ionize the air between two electrodes, rendering the air electrically conductive. When the optical fiber passes through the ionized region, the otherwise stationary electrical charges on the optical fiber are conducted away. Static discharging heads 34 are optionally placed at other locations along the travel path of the optical fiber, as illustrated. Static discharging heads 34 are commercially available from Herbert Products.

Figure 5:
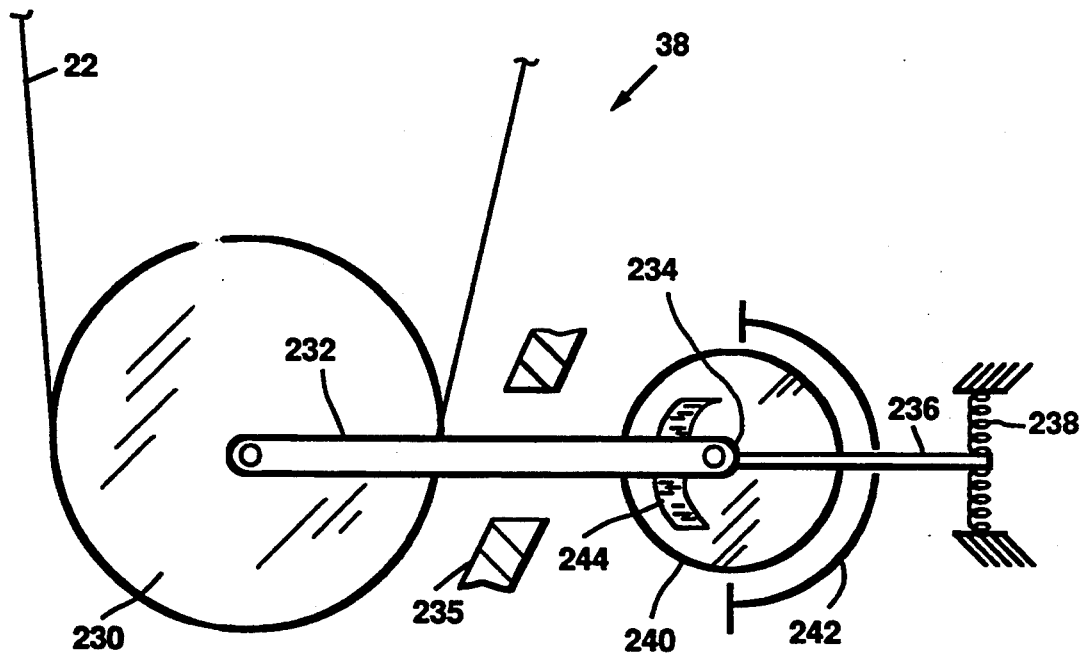
FIG. 5 is an elevational view of a tension dancer.

The tension in the optical fiber 22 is measured at several locations along its path of movement, and the first such location occurs just after the optical fiber leaves the cleaning/static discharging unit 30. The tension is measured by any convenient measuring device 36, but the preferred approach is to use a tension dancer 38, which is illustrated in more detail in FIG. 5.

The tension dancer 38 includes a pulley 230 over which the optical fiber 22 passes. The pulley 230 is rotationally supported on a support 232, which in turn is pivotally supported from a pivot support 234. Stops 235 prevent the support 232 from pivoting beyond preselected limits of angular rotation. The support 232 extends beyond the pivot support 234 as a biasing arm 236. The biasing arm 236 is biased to a central position by a spring 238 fastened to a stationary support. A metal disk 240 pivots with the support 232. A magnet 242 positioned adjacent to the disk 240 damps the movement of the disk 240, and thence the support 232 and the pulley 230 by eddy current damping. A rotational position encoder 244 also rotates with the support 282, and the degree of rotation of the support 232 is measured therefrom. The degree of rotation is a function of the tension in the optical fiber 22, and the relation between the tension and the degree of rotation is determined by a calibration performed before the dancer 38 is placed into service. Thus, the dancer 38 provides an indirect measurement of the tension in the optical fiber 22. The tension value for the optical fiber 22 is fed back to the supply motor 204 so that it can be controlled to maintain a preselected tension in the optical fiber 22.

Returning to FIG. 1, the supply spool 24 and its associated supply drive 26, the spool position sensor 28, the cleaning/static discharging unit 30, and tension-measuring device 36 together comprise a supply section of the test station 20. In the supply section, the optical fiber 22 is unwound from the supply spool 24 through a selected point in space to align it with the rest of the test station 20, cleaned, and measured for tension. Preferably, no tests of optical fiber characteristics are performed in the supply section, because the tension in the optical fiber cannot be sufficiently well controlled. Small winding discontinuities and faults in the optical fiber wound upon the supply spool 24 can cause jerks, transverse vibration, and other faults in the smooth movement of the optical fiber through the supply section. One important function of the supply section, together with the structure described next, is to isolate these faults so that in the next section there is a uniformly high tension.

Figure 6:
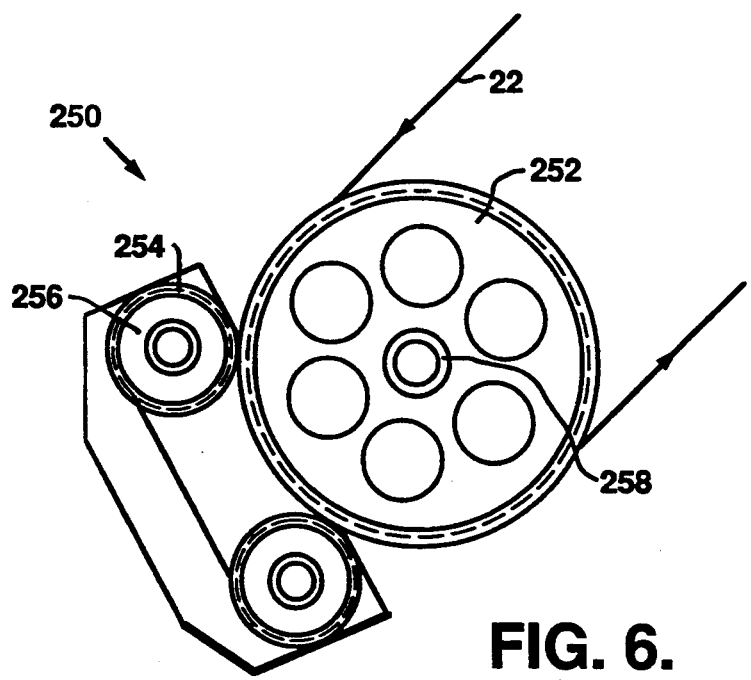
FIG. 6 is an elevational view of a tension isolating device.

A first tension-isolating device 40 is placed in the optical fiber path after it passes through the tension measuring device 36. The tension-isolating device 40, which also serves as a tension-increasing device as used at this point, is preferably a tension-isolating capstan 250, which is illustrated more fully in FIG. 6. The capstan 250 includes a pulley 252 over which the optical fiber 22 passes. The pulley 252 is driven by a torque motor (not shown). A moving belt 254, supported on spaced-apart wheels 256, is pressed against a portion of the circumference of the pulley 252 over which the optical fiber 22 passes. The contact occurs adjacent the low tension side of the pulley 252. The wheels 256 are spring loaded to place the belt 254 in tension. The belt position and tension equalize the pressure on the optical fiber. The axial tension applied to the optical fiber on the input side of the capstan 250 is controlled by the turning of the supply motor 204 and is measured by the tension dancer 38. The axial tension applied to the optical fiber on the output (high tension) is controlled by the rotational driving of the pulley 252.

The portion of the belt 254 that contacts the optical fiber 22 is preferably covered with a coating of the same material that is used to form the buffer layer of the optical fiber 22. For the preferred case, the coating is urethane acrylate. This coating prevents introduction of foreign matter into the buffer layer of the optical fiber 22.

The shaft upon which the pulley 252 is mounted is optionally provided with a rotary position encoder 258 that provides a direct measure of the rotary position of the pulley 252. The readout of the encoder 258 is directly converted to a length of optical fiber passing over the pulley by multiplying the number of revolutions of the pulley times the circumference of -the pulley. The rate of supply is calculated as the length of optical fiber passing over the pulley in a time interval, divided by that time interval.

The optical fiber next passes over a second tension measuring device 42, which preferably is identical in construction with the tension dancer 38 previously described.

The optical fiber subsequently passes over a second tension isolating device 44, which preferably is identical in construction with the capstan 250 previously described. The second tension isolating device 44 is, however, operated in a reverse fashion so that it reduces the tension in the optical fiber as the optical fiber passes over the capstan.

The devices 40 and 44 are operated so that the length of the optical fiber 22 between the first tension isolating device 40 and the second tension isolating device 44 has a high tension, and constitutes a high tension test section. The axial tension in the optical fiber is typically on the order of 100 to 300 grams of force in this high tension test section. The tension in the optical fiber is so controlled because there are particular tests of the optical fiber that require the application of a high tension to the optical fiber during the test. In the preferred embodiment illustrated in FIG. 1, two tests are performed in the high tension test section. The first is a buffer cure test 46, and the second is a bending proof stress test 48. These tests are provided in a modular form, and will be described subsequently in more detail.

The optical fiber 22 thereafter passes through a low tension test section from the second tension isolating device 44 to a receiver spool 50. The receiver spool 50 is mounted on a receiver drive 52 which has the same structure as the supply drive 26 described previously, and functions to control the speed of translation of the optical fiber 22. The second tension isolating device 44 operates in a manner similar to that of the first tension isolating device 40, and functions to maintain a low, controlled tension in the optical fiber 22 on the output side of the isolating device 40.

There is a receiver spool position sensor 54, which has the same structure and functions in the same manner as the sensor 28, and is used to operably control the receiver drive 52 in the same manner as previously described for the sensor 28 and the supply spool 24. The receiver drive 52 is normally operated to wind the optical fiber 22 onto the receiver spool 50 in a basket weave pattern that is suitable for subsequent winding of canisters. However, when the movement of the optical fiber 22 is reversed so that it unwinds from the receiver spool 50, the sensor 54 operates to pay out the optical fiber through a fixed point in space back into the test station 20 in the manner previously described. There is a receiver tension measuring device 56 to measure the tension in the portion of the optical fiber 22 between the second tension isolating device 44 and the receiver spool 50, which operates in the same manner as the first tension measuring device 36 described previously.

There are provided in the low tension test section various tests of optical fiber structure that are best performed when a low tension is applied to the optical fiber 22. In the preferred embodiment illustrated in FIG. 1, two such tests are provided. The first is a fiber diameter measurement test 58, and the second is a buffer flaw test 60. These tests are in a modular form, and will be described subsequently in more detail.

These tests require that the position of the optical fiber 22 in the tests be established precisely, and that there be no vibration in the optical fiber that would interfere with the measurements. Several fiber guides 62 are provided for this purpose. The fiber guides 62 are pairs of wheels rotationally mounted on axles and positioned to barely brush against the optical fiber 22 if it strays from the desired path or has transverse vibrations. The optical fiber 22 therefore normally barely touches the fiber guides 62, but may make a more firm contact if it strays from its desired path. It is preferred that minimal contact to the optical fiber 22 be made, because contact can potentially introduce dirt or damage to the fiber buffer layer. An advanced noncontacting fiber guide using an air stream as the restoring force is under development and may be used, but the wheel-type guides are presently preferred.

The various automated tests such as the tests 46, 48, 58, and 60 can detect potential out-of-limits conditions of the optical fiber, but at the present time it is still desirable to make a visual observation of any lengths of the optical fiber 22 that are thought to be potentially flawed. Since the great majority of the length of the optical fiber 22 is unflawed and since the optical fiber is moving at a speed as high as 6 meters per second or more, it is not necessary or practical to make a direct visual observation of the entire length of the optical fiber. Instead, each of the tests is monitored by a computer (not shown) that detects out-of-limits conditions. The computer then causes the optical fiber drives and the capstan drives to halt and reverse to bring the length of optical fiber that created the out-of-limits condition to a visual observation apparatus 64. Accurate positioning of the optical fiber 22 in the apparatus 64 is aided by recording the reading and rotational count of the optical position encoder 258, and associating that information in the computer memory with the warning of the out-of-limits condition. The optical fiber is backed to that encoder position, and then scanned at slow speed through the visual observation apparatus 64.

Figure 7:
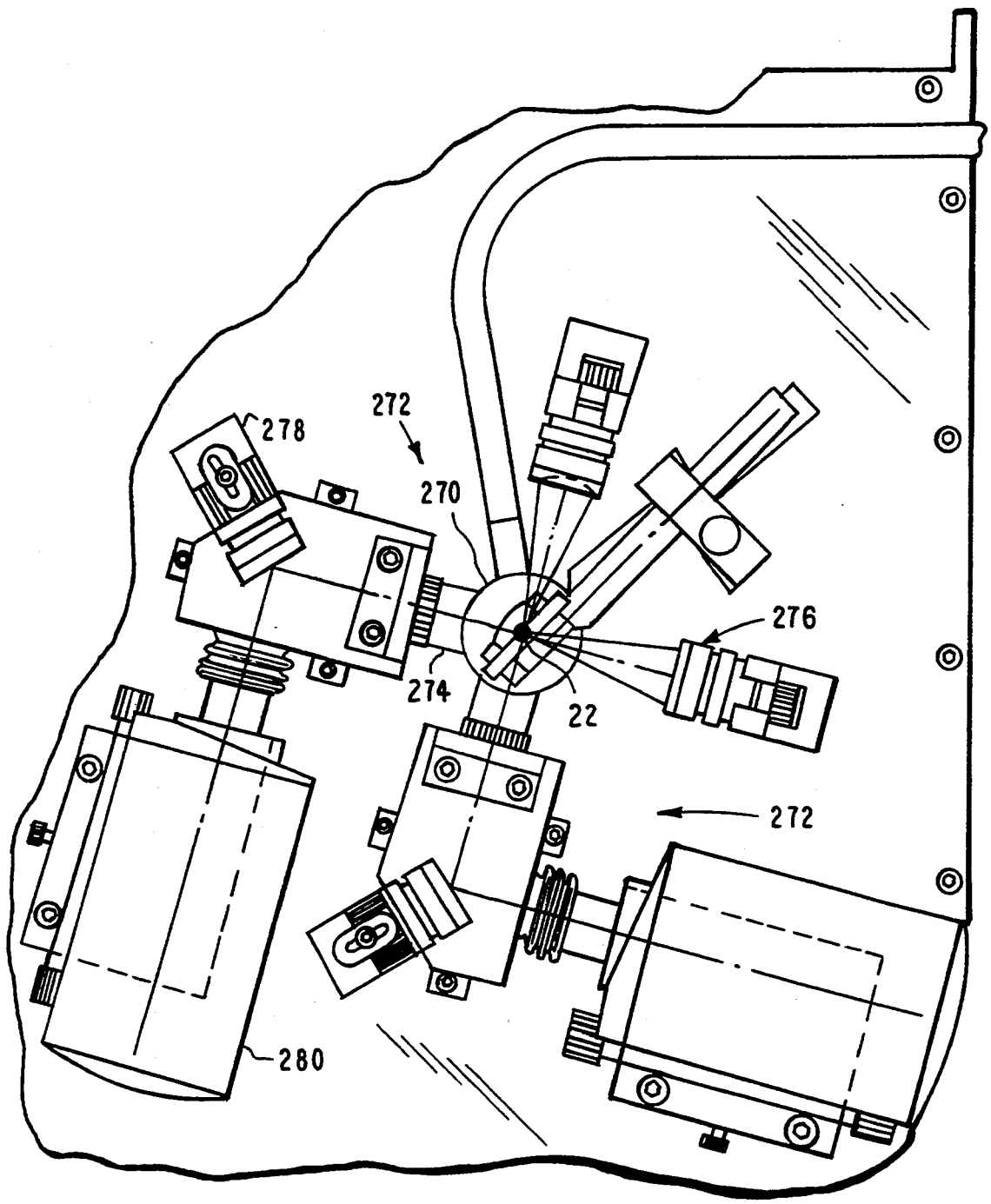
FIG. 7 is an elevational view of a visual observation apparatus.

The preferred visual observation apparatus 64, illustrated in more detail in FIG. 7, permits observation of the surface of the optical fiber 22 from four sides. Since the optical fiber 22 is somewhat translucent when viewed from the surface, this procedure also provides information about the interior of the optical fiber and possible flaws or defects that might be present.

Referring to FIG. 7, the optical fiber 22 is illuminated by a ring light 270 through which the optical fiber 22 passes. (The view of FIG. 7 is transverse to the path of the optical fiber, so that the optical fiber extends out of the plane of the figure.) The ring light 270 is a circular fiber optic unit powered by a high intensity quartz iodide lamp that Illuminates the optical fiber 22 uniformly about its circumference.

Two orthogonally oriented optical systems 272 are provided, which are substantially identical in structure and function. Each optical system 272 permits viewing of the front and back sides of the optical fiber 22. By placing the viewing path of the two optical systems 272 at a right angle to each other, views of the optical fiber 22 from four mutually perpendicular vantage points are made. These four views are electronically superimposed upon a single viewing screen (not shown), one in each quadrant of the screen, so that the single screen contains all four views of the optical fiber. A commercial high-resolution video recorder records the image for subsequent review.

The optical system 272 includes a front-side lens 274 that magnifies the image of the front side of the optical fiber as viewed by that optical system 272. A back-side element 276 is a spherical reflector having a curvature equal to the distance to the optical fiber 22, and tilted Just enough to direct the image of the back side of the optical fiber 22 past tile optical fiber and into the lens 274. (Tests have shown that the optical distortion of the back side image produced by this tilted arrangement is very slight and acceptable, because the small size of the optical fiber makes the required degree of tilting quite small.) The images of both the front side and the back side of the optical fiber are thus directed in a side-by-side manner through the lens 274, reflected by a planar mirror 278 (provided to make the apparatus directionally adjustable and more compact), and received by a CCD video camera 280. The two images are then electronically combined with the two images from the other optical system in the manner previously discussed.

Tests have shown that excellent automated imaging of the precise portion of the optical fiber causing an out-of-limits signal is readily attained using this portion of the test station 20. In these tests, an optical fiber was translated through the apparatus at about 100 micrometers per second. An out-of-limits condition was located to within 500 micrometers of travel of the optical fiber. The test station automatically stopped, reversed to the correct location, and visually recorded the portion of the optical fiber which produced the out-of-limits condition. This information was available for subsequent review in evaluating the nature of the structure that caused the out-of-limits condition and the possibility of repair.

A preferred form of the apparatus used in the continuous buffer cure test 46 measures the cure state by pressing the optical fiber against a surface, and measuring the amount of light that is transmitted into and escapes upwardly out of the optical fiber from a beam of light directed against the underside of the surface. This escaped light is related to the extent of deformation of the buffer layer of the optical fiber, which in turn is a measure of the degree of curing of the buffer layer.

Figure 8:
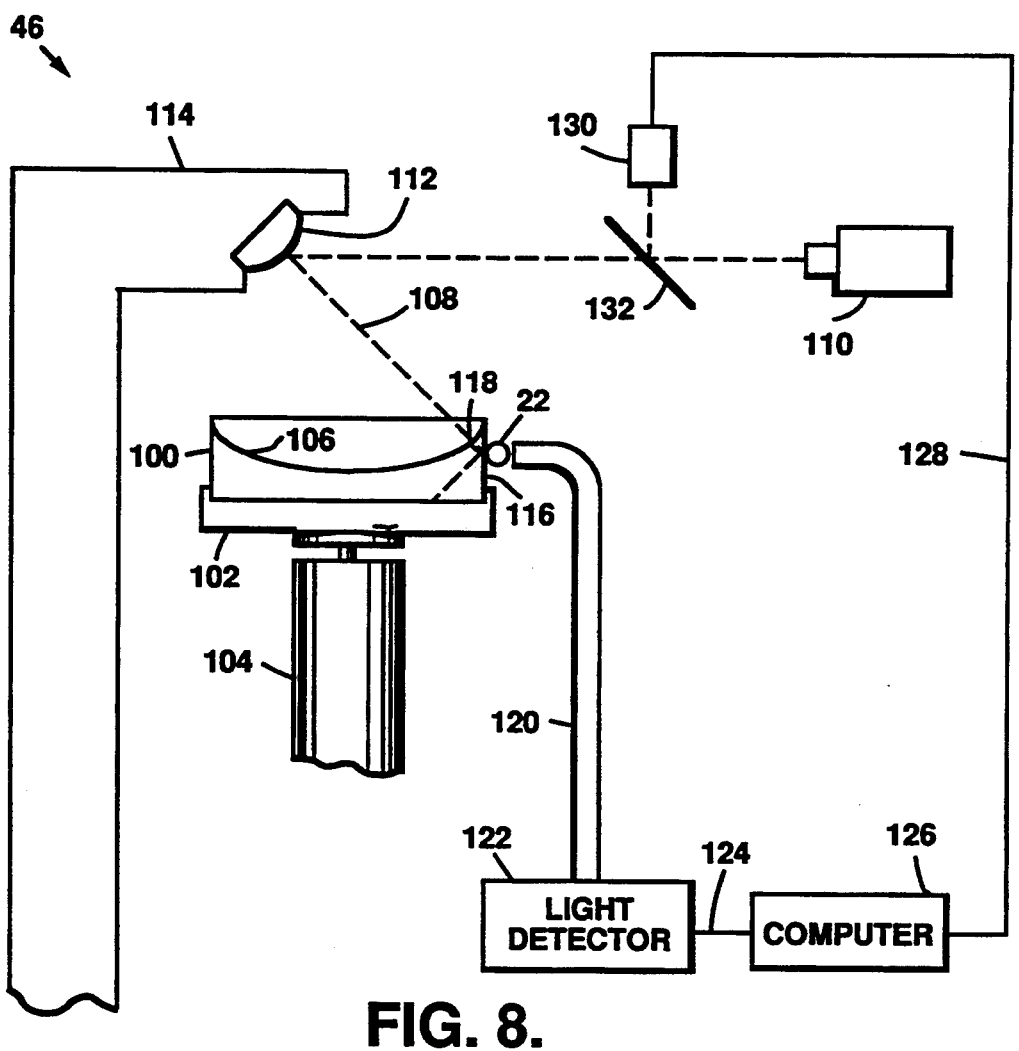
FIG. 8 is a schematic diagram of a buffer cure test device.

FIG. 8 illustrates a practical and preferred apparatus 45 for continuously measuring the amount of escaped light rays as the optical fiber 22 is passed over a transparent pulley 100. The pulley 100 is mounted on a support 102, which is mounted on a bearing 104 that permits the support 102 and the pulley 100 to turn freely. The optical fiber 22 is continuously transported over the pulley 100 in the direction out of the plane of the figure.

The pulley 100 is made of glass and constructed as a transparent lens with a concavely curved inner surface 106. A light beam 108 is generated from a source 110 that is preferably a helium-neon laser that emits red light at a wavelength of 6328 Angstroms. The light beam 108 is reflected by a cylindrical mirror 112 mounted on a mirror mount 114 to enter the pulley 100 through the inner surface 106. The cylindrical mirror 112 spreads the beam 108 into a narrow fan in the dimension parallel to the plane of the figure. The fan intersects the cylindrical surface of the glass pulley 100 in a line parallel to the cylindrical axis, providing uniformity of irradiation in the plane of varying contact. The effectiveness of the apparatus and the test would be less if the intensity of the beam 108 varied along the length of the fan.

The pulley 100 and its inner surface 106, and the mirror mount 114, are cooperatively arranged so that the light beam 108 strikes the inner surface 106 generally perpendicularly to that surface and passes into the body of the pulley 100. The components are further arranged such that the light beam 108 strikes the underside of a support surface 116 over which the optical fiber 22 passes at an angle of approximately 45 degrees, as illustrated. This arrangement is readily attained in the manner illustrated in FIG. 8. In the absence of the optical fiber 22, the light beam 108 is totally internally reflected from the underside of the curved support surface 116.

A portion of the light of the beam 108 is extracted from tile pulley 100 through a contact region 118 between the optical fiber 22 and the support surface 116, some of which in turn escapes out of the optical fiber 22. The portion of the light that escapes from the optical fiber 22 is received and gathered by an fiber optic collector 120 and conducted to a laser light detector 122 where the intensity of the escaped light is measured.

An electrical signal 124 proportional to the intensity of the escaped light is provided to a computer 126. The signal 124 is proportional to the product of the contact length of the optical fiber against the surface times the width of the fan of the light beam 108. Since the width is constant, the signal 124 is proportional to the contact length.

A signal 128 proportional to the intensity of the beam 108 is measured by a laser light detector 130 that receives the light from a partially silvered mirror 132 in the beam 108, and is provided to the computer 125. The escaped light signal 124 is divided or normalized by the total beam signal 128 to account for variations in the output intensity of the laser 110.

The magnitude of the escaped light signal 124 is a direct measure of the contact area of the contact region of the optical fiber against the support surface. The normalized value of this signal 124 can be compared against preselected acceptability criteria to determine whether the segment of the optical fiber 22 being measured at that time meets the acceptability criteria. For example, if the preselected acceptability criteria require that the normalized signal produced by dividing the signal 124 by the signal 128 be within a preselected range, and the normalized signal is within that range, then the properties of the buffer layer are concluded to be within the proper acceptable range. On the other hand, if the normalized signal is not within that preselected acceptability range, an error condition requiring further investigation is indicated.

In a modification to this device, the light collector 120 and light detector 122 can be duplicated at another location on the rim of the pulley 100, preferably the diametrically opposite position to the described collector and light detector. The second collector and light detector respond to dirt and surface imperfections of the pulley 100 that can affect the magnitude of the light intensity even without an optical fiber present. That information is used to cancel out the effects of such dirt and imperfections in the light intensity transmitted through the optical fiber 22.

Figures 10, 11:
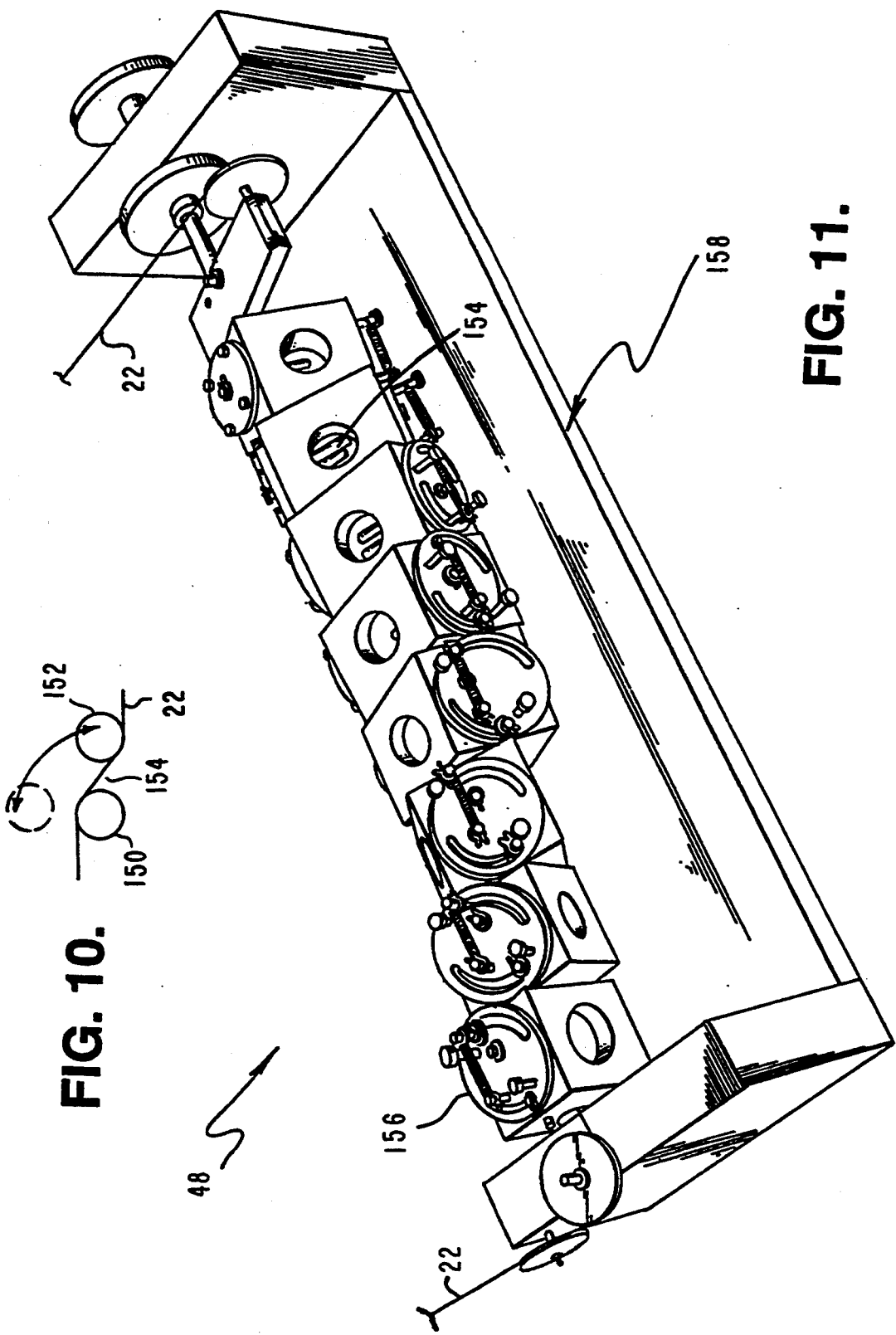
FIG. 10 is a schematic elevational view of a portion of an optical fiber stress proof test device.
FIG. 11 is a perspective view of an optical fiber stress proof test apparatus.

When an optical fiber is peeled from a bobbin during service, it is bent through a relatively small peel radius. If the optical fiber should fail during that bending at any location along its length, the entire optical fiber would be rendered inoperable. FIG. 1 illustrates the overall structure of the stress proof test apparatus 48. FIG. 10 illustrates the principle of operation of the apparatus 48, and FIG. 11 illustrates the structure of the preferred approach schematically so that the operable relation of the elements may be seen.

Referring to FIG. 10, the optical fiber 22 is bent over a pair of rollers 150 and 152, which form a roll pair 154, whose axes define a plane in which the optical fiber lies. The rollers 150 and 152 are longitudinally displaced along the length of the optical fiber. This arrangement forces the optical fiber 22 to bend between the rollers 150 and 152 in the manner illustrated. The optical fiber 22 is thereby bent through a radius equal to that of the rollers 150 and 152, first in one direction and then in the direction 180 degrees from the first one. The stress experienced in the optical fiber 22 is determined by the radius of the rollers 150 and 152. Three roller radii have been used, ⅛ inch, 3/32 inch, and 1/16 inch, corresponding to bending stresses of approximately 200,000 pounds per square inch (psi), 300,000 psi, and 400,000 psi, respectively. If the optical fiber 22 does not fail, it is concluded that it has sufficient strength to bend through the same radius during service. To facilitate loading and placement of the optical fiber 22 between the rollers 150 and 152, one of the rollers of the pair, here the roller 152, is mounted on a mechanism that moves the roller 152 between its operating position illustrated in solid lines and a loading position illustrated in broken lines in FIG. 10.

It is not possible to predict whether the optical fiber will be bent only in the directions tested by a single pair of rollers 154, and therefore the preferred proof test apparatus 48 is provided with multiple pairs of rollers 154, as illustrated in FIG. 11. Each pair of rollers 154 is mounted in a mounting block 156. In the operating position of the preferred apparatus 48, as shown in FIG. 11, there are eight pairs of rollers 154 mounted in eight individual mounting blocks 156 in a frame 158. Each block is rotated by 22.5 degrees with respect to the adjacent block, so that the optical fiber 22 is progressively bent through directions displaced through sixteen equally spaced directions about its circumference. If there is a flaw at any location along the length of the optical fiber 22 that would cause failure of the optical fiber as it is bent through a peel radius during service, it is highly probable that this approach would detect such a flaw by causing the optical fiber to fail during testing.

The buffer cure test 46 and the stress proof test 48 are preferably accomplished within the high tension test section. In the buffer cure test 46, a high, controlled axial tension is applied to the optical fiber to create a reproducible contact stress of the optical fiber against the contact surface. In the stress proof test 48, a high axial tension is applied to the optical fiber to ensure that the optical fiber will adhere to the surface of the radius of the rollers 150 and 152. Any other tests that similarly require a high applied tension are performed in the high tension test section.

A full length optical transmission test is also preferably performed on the optical fiber 22 as it is translated through the test station 20. In service, the optical fiber is progressively bent through a relatively small bending radius as it is peeled from the bobbin upon which it is wound. As just discussed, the stress proof test 48 introduces one or more bends into the optical fiber to proof test its strength as it passes through a small bending angle. This severe bending also attenuates the amplitude of the light signal passing through the optical fiber, and the degree of attenuation is of interest in assessing the suitability of the optical fiber. This combination of tests, the stress proof test and the full length optical transmission test, provide a close simulation of the missile payout of the optical fiber, except as to the rate of payout which in service may be on the order of hundreds of meters per second rather than 1–10 meters per second.

In the full length optical transmission test, light is injected into the optical fiber at one end and received at the other, and the arrangement of components is best illustrated in the schematic illustration of FIG. 9. The optical fiber 22 is unwound from the supply spool 24, passed through the stress proof test 48 where it is bent through a severe radius at least once and possibly several times, and wound onto the receiver spool 50. Although the optical fiber is bent over other radii such as pulleys and the capstans, these bends are much less severe and are known to have little effect on the optical transmission.

A laser 300 injects a beam of light 302 into a free end 304 of the optical fiber 22. The laser 300 is preferably a solid state, 1.55 micrometer laser which has an internal intensity detector 308. The output signal 310 of the detector 308 provides the standard against which the received signal is measured. The laser beam 302 is injected into the free end 304 of the optical fiber 22 through an injector port 312. The laser 300 is mounted on the supply spool 24 and turns with it, avoiding the need for a rotating optical coupler. Equivalently, the laser could be stationary and the injection accomplished through a rotating optical coupler.

At the receiver end, a free end 316 of the optical fiber 22 is connected through a coupler 317 to an output Intensity detector 320. The coupler 317 is a spherical lens attached to the detector 320 and aligned so that all energy from the optical fiber 316 falls onto the detector 320, regardless of the rotational angle. An output signal 322 of the detector 320 provides the received signal. The output signals of the detectors 308 and 320 are compared by a comparator 324, as a measure of the light attenuation caused by the severe bends in the optical fiber as it passes through the tester 48. Since the light beam passes through the entire unbent length of the optical fiber at all times, any variations In signal are due to bending a specific length of the optical fiber in the tester 48, and these variations may be related to any out-of-limits conditions in the optical fiber.

Two tests that do not require a high applied tension are the fiber diameter test 58 and the buffer flaw test 60.

Figure 12:
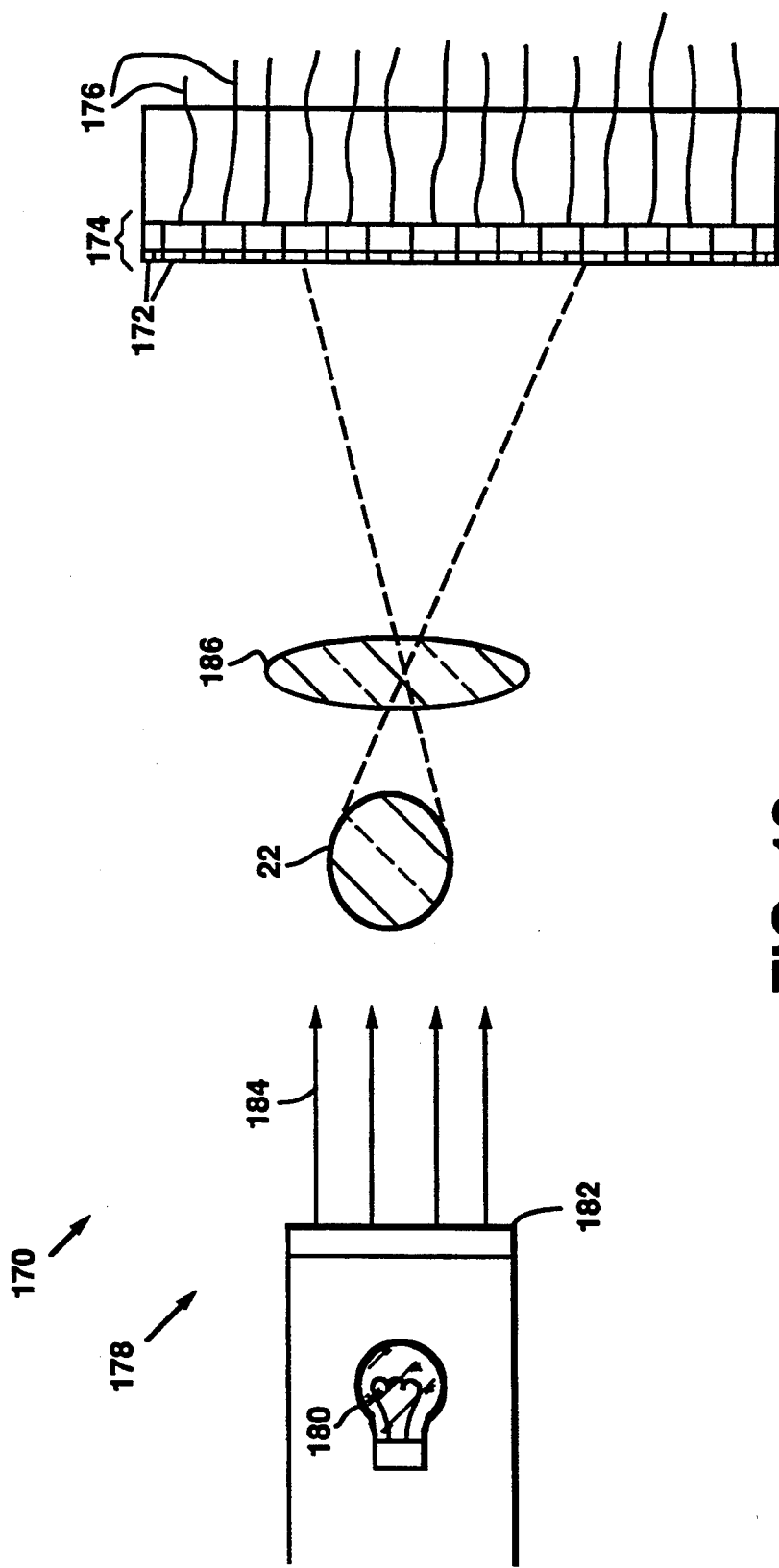
FIG. 12 is a schematic view of an optical fiber diameter measurement test device.

Referring to FIG. 12, a preferred apparatus 170 for performing the optical fiber diameter test 58 includes a plurality of light sensors 172 arranged in a linear array 174. Each sensor 172 produces a signal indicative of the intensity of the light falling thereon, as indicated schematically with a signal line 176 extending from each sensor 172. A light source 178 includes a lamp 180 that is directed at one side of a diffuse white screen 182. The white screen 182 emits a light beam 184 in the direction of the array 174.

The optical fiber 22 is positioned between the light source 178 and the sensor array 174. In the illustrated view of FIG. 12, the elongated direction of the optical fiber 22 is perpendicular to the plane of the page, and the diameter of the optical fiber 36 is exaggerated for illustrative purposes. In practice, the diameter of the optical fiber 22 is about 250 micrometers (about 0.010 inches), while the length of the linear array 174 is about 1 inch. To make use of a good portion of the full length of the array 174, a lens 186 is placed between the optical fiber 22 and the array 174, to enlarge the image of the optical fiber 22 and direct it to the plane of the array 174.

The array 174 is preferably a Reticon model LC 1901 linear diode array manufactured by EG&G, Sunnyvale, Calif. This diode array contains 2048 active diodes in a linear array about 1 inch long. The geometry of the apparatus 170 is adjusted so that the shadow of the optical fiber 22 covers about one-half of the length of the array 174, or about 1000 diodes. The resolution of the apparatus is therefore about 1/1000 or 0.1 percent of the optical fiber diameter. This resolution is sufficient for assessments of suitability of an optical fiber for winding onto a bobbin to make a canister.

One instantaneous set of the continuous readings of the light sensors 172 is obtained by a frame grabber. The values are individually compared to limiting values with a gate or comparator, to determine whether each sensor 172 has a high or a low light output signal. If a low output signal, the sensor is concluded to be in the shadow of the optical fiber 22. A counter establishes the number of sensors 172 that are in shadow, and that number is taken to be indicative of the diameter of the optical fiber 22. In the measurement approach that yields usable information in the fastest manner, the number of sensors In shadow is compared to previously established limits for the selected apparatus geometry. If the number of sensors in shadow is within those limits, it is concluded that the diameter of the optical fiber is within acceptable limits. Otherwise, an out-of-limits condition is signalled.

Most preferably, two of the units 170 are utilized, at right angles to each other to measure the optical fiber diameter at two right angles.

Another test preferably performed at low applied tensions is the buffer flaw test 60. The preferred buffer flaw test is that disclosed in U.S. Pat. No. 4,924,087, which disclosure is herein incorporated by reference.

Two tests that are preferably performed in the high tension test section, and two tests that are preferably performed in the low tension test section, have been discussed. Each of these tests signals an out-of-limits condition where appropriate, which signal is used in the manner previously indicated to stop the translation of the optical fiber, to rewind the optical fiber (except in the case of the bend proof test), and to visually record the section of optical fiber causing the out-of-limits condition. The longitudinal position of the optical fiber as determined from the position encoder 258 is associated with this information, to provide a complete record of any portions of the optical fiber that have an out-of-limits condition of any sort. This approach permits optical fiber to be procured and tested using quantitative evaluation criteria directly established in relation to the ultimate uses of the optical fiber. The four tests described herein are of particular interest in relation to optical fibers to be wound on a bobbin with an adhesive and later paid out at a high rate, but other tests of interest can be used as needed. Other tests may be added or some of the existing tests removed to tailor the test station 20 for particular applications of the optical fiber.

Although particular embodiments of the invention have been described in detail for purposes of illustration, various modifications may be made without departing from the spirit and scope of the invention. Accordingly, the invention is not to be limited except as by the appended claims.

What is claimed is:

1. An optical fiber test station, comprising:
a supply section, including
means for supplying a continuous length of optical fiber through a fixed point;
a high tension test section through which the optical fiber passes after leaving the supply section, including
means for increasing the tension in the optical fiber to a preselected higher tension than found in the supply section, and
at least one test of optical fiber quality performed on the optical fiber while it continuously moves through the high tension test section; and
a low tension test section through which the optical fiber passes after leaving the high tension test section, including means for reducing the tension in the optical fiber to a preselected lower tension than found in the high tension test section, at least one test of optical fiber quality performed on the optical fiber while it continuously moves through the low tension test section, and means for winding the optical fiber onto a receiver spool.

2. The test station of claim 1, further including means for automatically recording the location of defects identified in the optical fiber by one of the tests performed on the optical fiber.

3. The test station of claim 1, further including a tension sensor in the supply section that measures the tension in the length of optical fiber, and supplies a measurement thereof to the means for supplying.

4. The test station of claim 1, further including a tension sensor in the high tension test section that measures the tension in the length of optical fiber.

5. The test station of claim 1, further including a tension sensor in the low tension test section that measures the tension in the length of optical fiber.

6. The test station of claim 1, further including a cleaning unit through which the length of optical fiber passes while in the supply section.

7. The test station of claim 1, wherein a test performed in the high tension test section is a buffer cure test.

8. The test station of claim 1, wherein a test performed in the high tension test section is a bending stress test.

9. The test station of claim 1, wherein a test performed in the low tension test section is a fiber diameter measurement test.

10. The test station of claim 1, wherein a test performed in the low tension test section is a fiber defect measurement test.

11. The test station of claim 1, further including means for measuring the transmission of light through at least a portion of the length of the optical fiber, that portion including the length that is within the high tension test section.

12. An optical fiber test station, comprising:

a supply section, including means for supplying a continuous length of optical fiber through a fixed point, a cleaning and static discharging unit through which the length of optical fiber passes, a tension sensor that measures the tension in the length of optical fiber, and supplies a measurement thereof to the means for supplying;

a high tension test section through which the optical fiber passes after leaving the supply section, including means for increasing the tension in the optical fiber to a preselected higher tension than found in the supply section, and at least one test of optical fiber quality performed on the optical fiber while it continuously moves through the high tension test section; and a low tension test section through which the optical fiber passes after leaving the high tension test section, including means for reducing the tension in the optical fiber to a preselected lower tension than found in the high tension test section, at least one test of optical fiber quality performed on the optical fiber while it continuously moves through the low tension test section, and means for winding the optical fiber onto a receiver spool.

13. An optical fiber test station, comprising:

a test module for performing a test of optical fiber quality while the optical fiber moves continuously through the test module;

means for transporting the optical fiber through the test module, the means for transporting including a supply section, a receiver section, and an optical fiber guide;

means for automatically recording the position of any defect identified in the optical fiber as it passes through the test module; and means for moving the portion of the optical fiber having the defect to a photographic section having a photographic device with a field of view, for stopping the movement of the optical fiber with the defect within the field of view of the photographic device, and for photographically recording the defect with the photographic device; and means for associating the photographic record of the defect with the position of the defect as determined by the means for automatically recording.

* * * * *